Nov. 18, 1930.  B. R. SIMMONS  1,782,051
TILE MACHINE
Filed Jan. 26, 1929   5 Sheets-Sheet 1
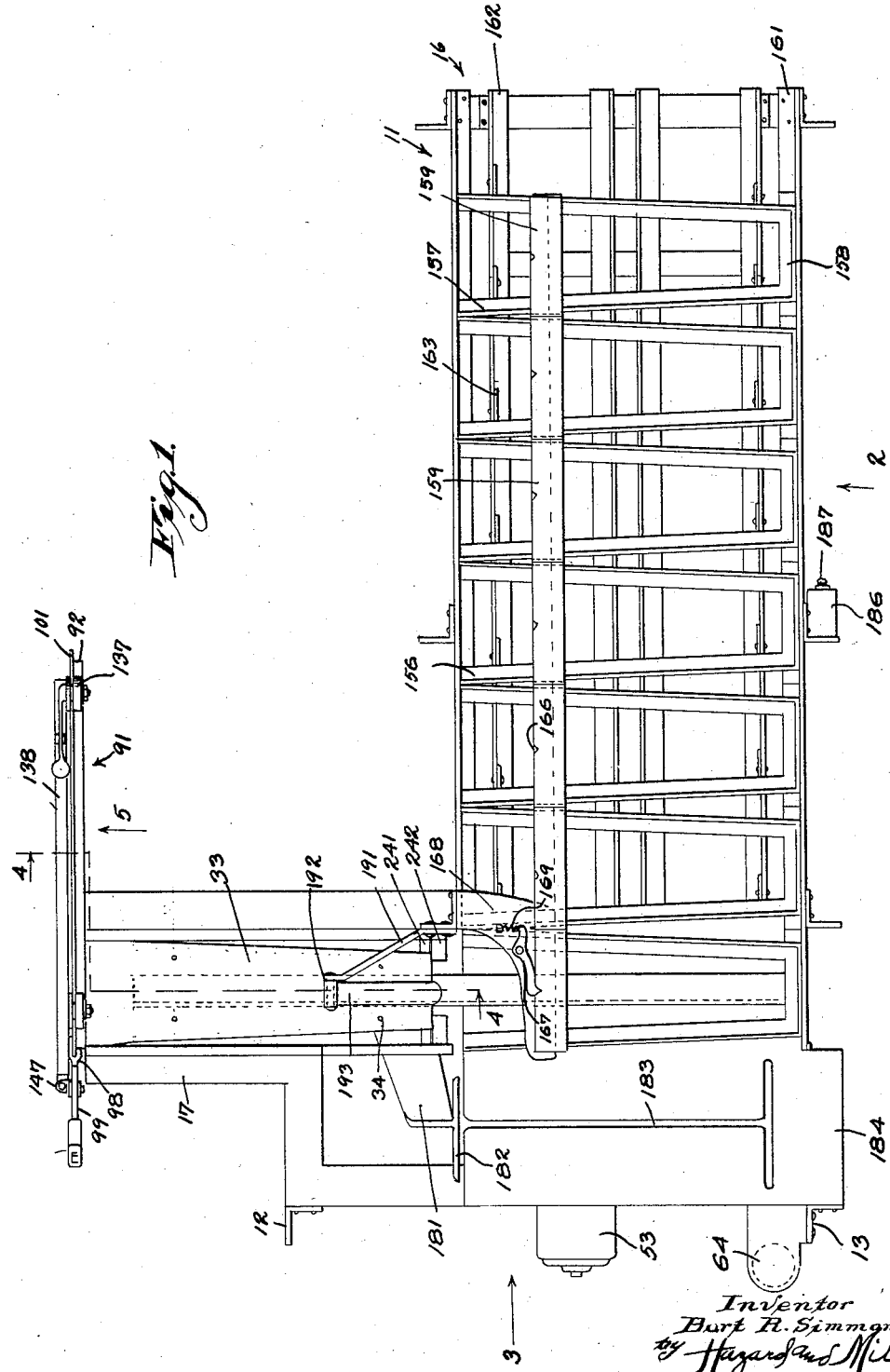

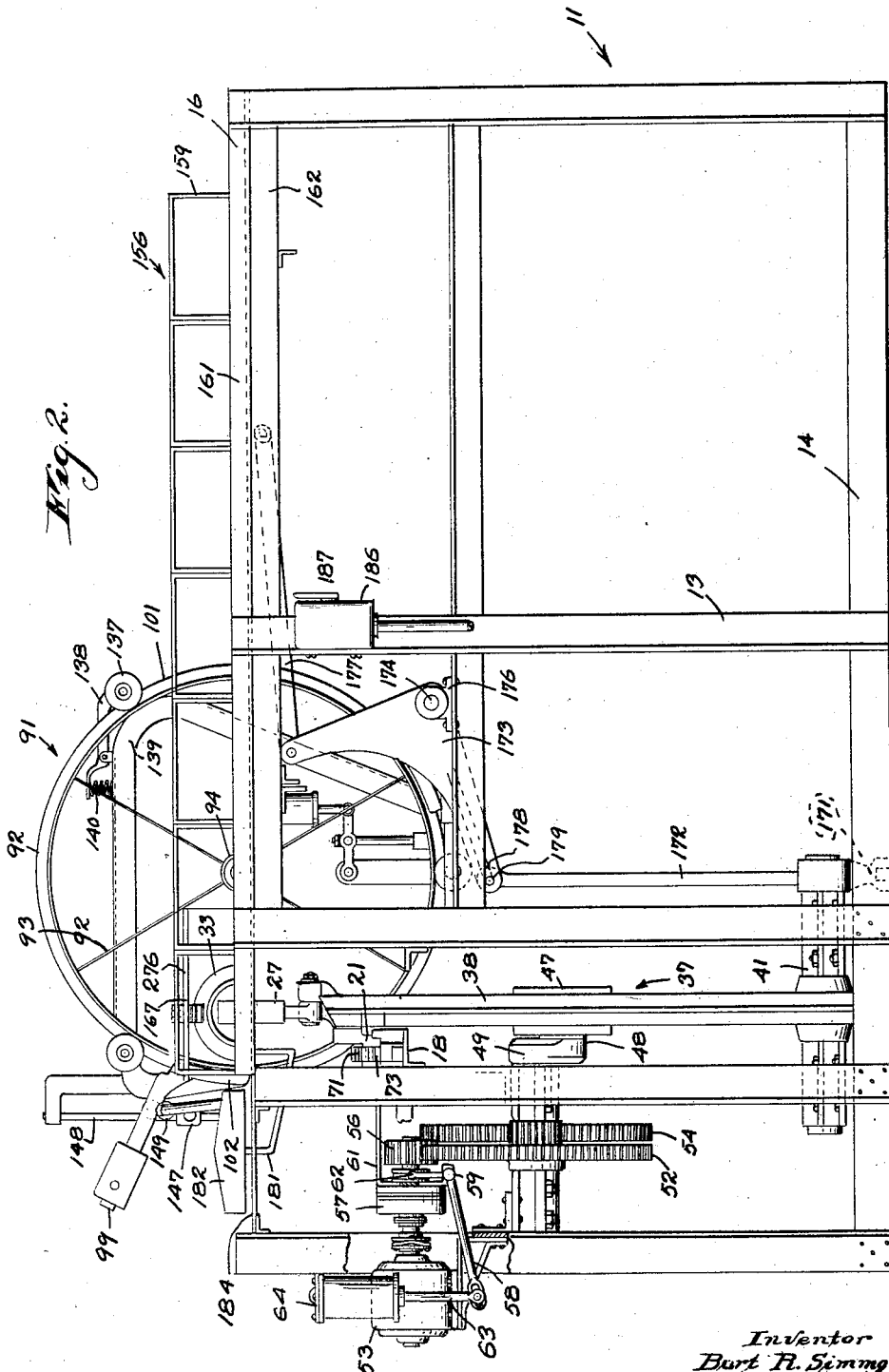

Nov. 18, 1930.  B. R. SIMMONS  1,782,051
TILE MACHINE
Filed Jan. 26, 1929  5 Sheets-Sheet 3
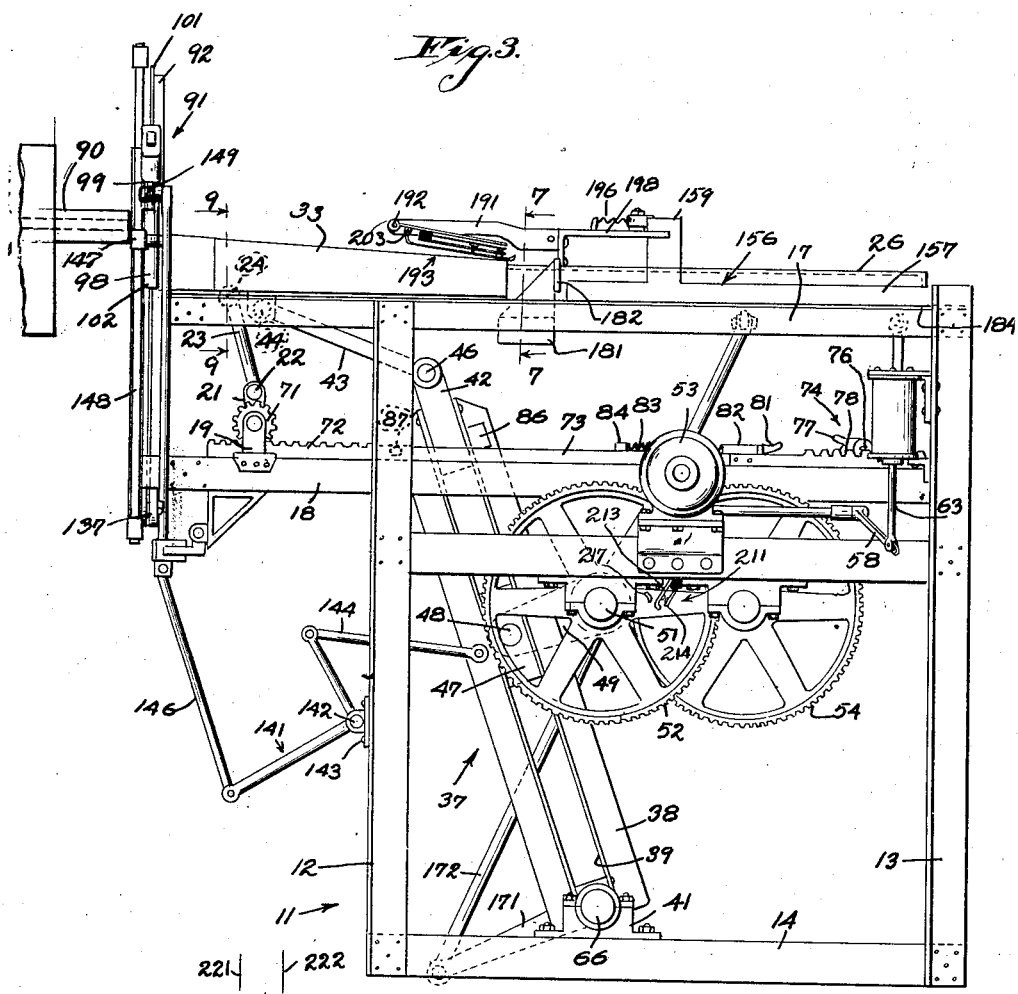
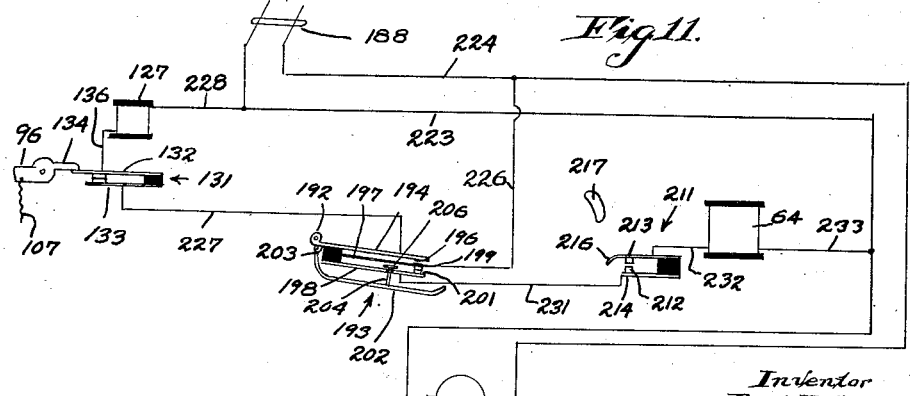

Nov. 18, 1930.  B. R. SIMMONS  1,782,051
TILE MACHINE
Filed Jan. 26, 1929  5 Sheets-Sheet 4
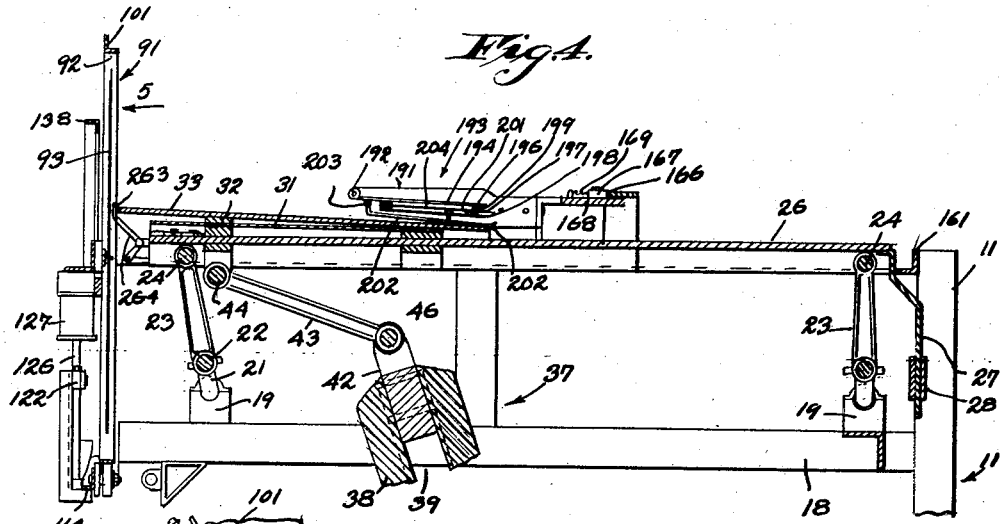
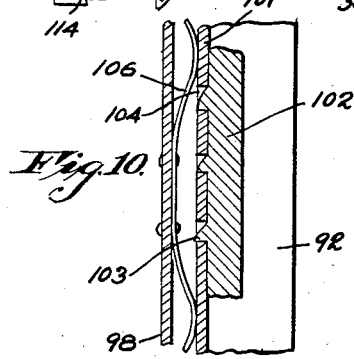
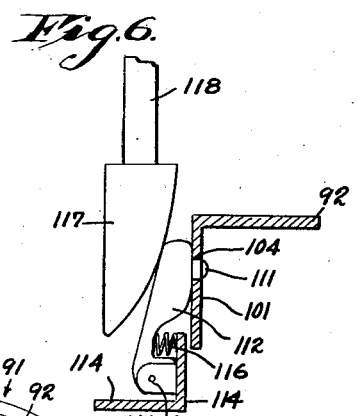
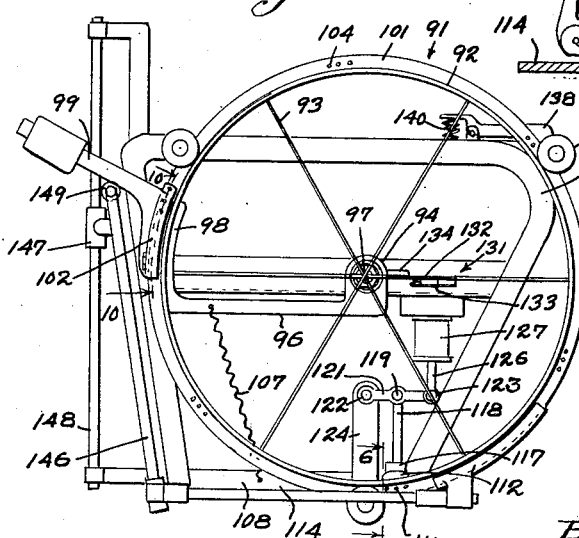
Inventor
Burt R. Simmons.
by Hazard and Miller
Attorneys

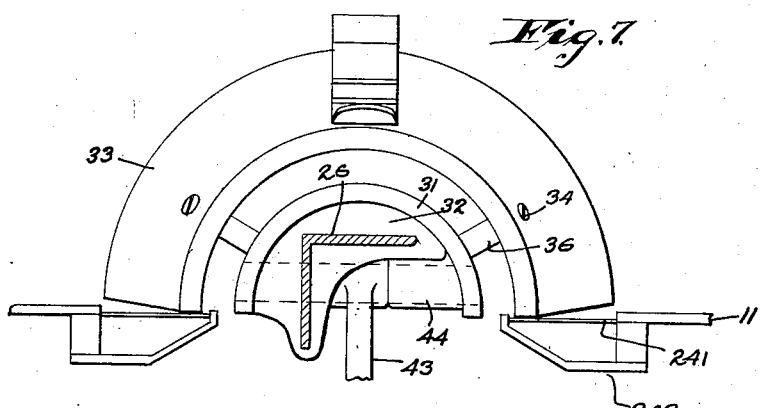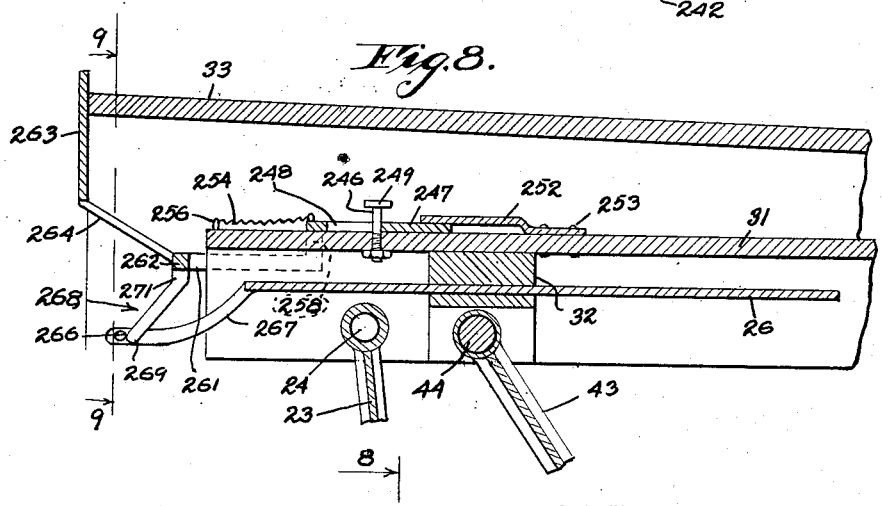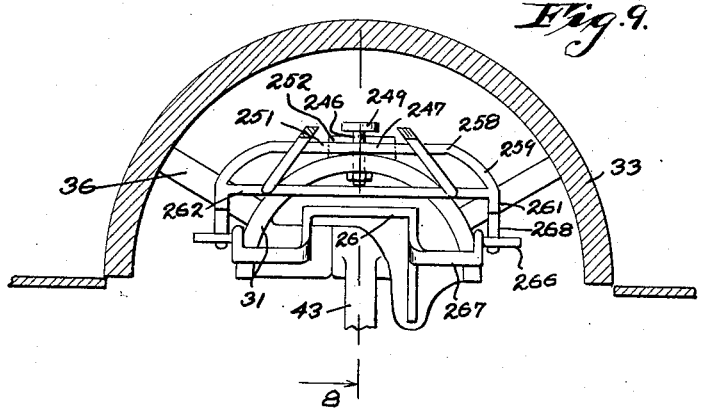

Patented Nov. 18, 1930

1,782,051

UNITED STATES PATENT OFFICE

BURT R. SIMMONS, OF PALMS, CALIFORNIA

TILE MACHINE

Application filed January 26, 1929. Serial No. 335,219.

This invention relates to ceramic industries, and more particularly to a machine useful in the manufacture of tile.

An object of the invention is the provision of a machine capable of receiving a predetermined amount of plastic tile-forming material from the pug mill, shaping the material either partially or completely to the desired configuration, and depositing the material upon a tray adapted to hold the material during the drying and baking process.

A more detailed object is the provision of a tile-forming machine as described, in which the receiving means or pallet is of such configuration that the plastic material deposited thereon is so shaped thereby that the ultimate tile after baking, may be employed as a roof tile, its configuration being substantially that of a hollow semi-cylinder slightly larger at one end than at the other. This type of tile is commonly known as a pantile, and is the type used by the early missionaries of California.

A further object is the provision of means for accurately positioning and retaining the severing means so as to avoid interference with subsequent depositing of plastic material upon the pallet.

It is a further object of the invention to provide means for rapidly severing a predetermined length of the plastic tile-forming material which issues from the pug mill, in the form of a ribbon, and receiving this severed portion upon the pallet.

A further object is the provision of a tile forming machine adapted to receive a predetermined length of tile-forming material upon a pallet as described, and then to transport the severed length from that position in which it is deposited upon the pallet, and placing the resultant green tile upon a tray, after which the tray is discharged from the machine and an empty tray substituted therefor, all of these operations being carried out automatically by the machine itself.

A further object is the provision of a tile-forming machine as described, in which the tile-forming pallet is removable and interchangeable so as to form pantiles of different dimensions. Furthermore, the means for advancing the trays, are capable of being so adjusted as to accommodate trays of the proper dimensions to coincide with the particular pallet being employed.

A further object is the provision of means for trimming the side edges of the green tile as the pallet transports it from receiving position.

Still another object is the provision of means for anchoring the plastic green tile to the pallet to prevent displacement thereof by the trimming means as the pallet moves therepast.

A still further object is the provision of means for holding the pallet stationary until the desired length of the ribbon of raw material has been deposited thereon, and then automatically severing it from the remainder of the ribbon and starting the transporting mechanism.

A still further object is the provision of means for moving the pallet and the green tile carried thereby, slowly from receiving position, this means constituting however, a quick return mechanism adapted to move the pallet more rapidly upon its return stroke.

A further object is the provision of a tile-forming machine comprising a green tile receiving pallet slidably mounted upon a track, and this track being adapted for vertical movement. The mechanism of the machine is such that after the material has been received upon the pallet, the pallet is slid longitudinally of the track until it is positioned over a tray, whereupon the track moves vertically downwards to deposit the tile upon the tray and permit the pallet to move on therethrough, after which the pallet slides in a reverse direction and the track rises to dispose the pallet in initial position.

A further object is the provision of mechanism for dropping the track relatively rapidly so that the tile will not be slid onto the tray but dropped vertically thereupon, thus avoiding the tendency to produce a tile with rough, uneven edges.

A still further object is the provision of a tile-forming machine of the general character described, which, although it is capable of operating efficiently to carry out the manifold objects of the invention, it is composed of a relatively few parts, each of which is of a simple nature, and which may be assembled into a complete mechanism with a minimum of labor and expenditure of time, to produce a machine capable of automatically carrying out the tile-forming process in its entirety.

The invention possesses other objects and advantageous features, some of which, with those enumerated, will be set forth in the following description of the invention's particular embodiment which is illustrated in the drawings accompanying and forming a part of the specification.

Referring to the drawings:

Figure 1 is a top plan view of a machine incorporating the principles of my invention.

Fig. 2 is a rear elevation, the direction of view being indicated by the arrow 2 of Fig. 1.

Fig. 3 is a side elevation, the direction of view being indicated by the arrow 3 of Fig. 1.

Fig. 4 is a compound, vertical sectional view of the cutting mechanism, the pallet and the quick return mechanism associated therewith. The planes of section are indicated by the lines 4—4 of Fig. 1, and the direction of view by the arrows.

Fig. 5 is a rear elevation of the cutting mechanism, the direction of view being indicated by the arrows 5 of Figs. 1 and 4.

Fig. 6 is an enlarged detail view in vertical section, of the means for locking the cutting means stationary. The plane of section is indicated by the line 6—6 of Fig. 5, and the direction of view by the arrows.

Fig. 7 is an enlarged detail view in vertical section, of the pallet and the carriage on which it is mounted. The plane of section is indicated by the line 7—7 of Fig. 3, with the direction of view as indicated.

Fig. 8 is a vertical sectional view taken longitudinally of the forward end of the pallet and its carriage, the plane of section being taken upon the line 8—8 of Fig. 9, with the direction of view as indicated.

Fig. 9 is a vertical, transverse sectional view of the pallet and carriage, taken upon the line 9—9 of Fig. 3, with the direction of view as indicated.

Fig. 10 is an enlarged detail sectional view taken upon the curved plane indicated by the line 10—10 of Fig. 5, with the direction of view as indicated.

Fig. 11 is a wiring diagram showing the electrical connections between the various electrically operated portions of the machine.

Specifically describing the invention's most practical form of which I am at present aware, the operative parts of the mechanism are mounted upon a suitable framework 11 composed of front and rear posts 12 and 13 respectively, rising from suitable sills 14. The posts 12 and 13 support a bed 16, and upper and lower side rails 17 and 18 respectively, adjacent one side of the frame 11.

The side rail 18 carries a bracket 19 adjacent each end thereof, and a crank 21 is journalled for rotary movement in each bracket 19. Mounted upon the crank pin 22 of each of the cranks 21, is a connecting rod 23, the upper end of which is pivoted by a wrist pin 24 to the under side of a rail 26 which is preferably formed of a piece of angle iron as best shown upon Figs. 7 and 9. A bar 27 rigid with the track 26 preferably adjacent its after end, is vertically slidable in a guide 28 rigid with the frame 11, with the result that the track 26 is held against horizontal movement, but is permitted vertical translatory movement, this vertical movement being determined by the cranks 21.

A carriage 31 is slidably mounted upon the track 26 in any suitable manner as by webs 32 rigid with the under side thereof. A pallet 33 is removably and interchangeably secured to the carriage 31 as by screws 34 extending through the pallet 33, through distance pieces 36, and threaded into the carriage 31. Preferably the pallet 33 has substantially the configuration of a hollow semi-cylinder tapering toward the after end thereof. The carriage 31 may be fabricated either with parallel walls, or it also may be slightly tapering, the proper positioning of the selected pallet 33 depending upon the distance pieces 36 being suitably proportioned. It is to be understood that by providing a plurality of pallets 33 of different size, any selected one of which may be rigidly attached to the carriage 31, pantiles of various dimensions may be formed by the mechanism.

A quick return mechanism indicated in its entirety at 37, is employed for reciprocating the carriage 31 and with it the selected pallet 33, back and forth upon the track 26. This quick return mechanism 37 comprises a beam 38 having a longitudinally extending slot 39 therein and journalled for rocking movement upon a bracket 41 rigid with one or more of the sills 14. The beam 38 may conveniently be formed of angle irons rigidly attached in spaced relationship to provide the slot 39. The upper end 42 of the beam 38, is connected by a link 43, to a wrist pin 44 rigid with the under side of the carriage 31, it being understood that the link 43 is also pivoted to the upper end 42 of the beam 38, as by a pin 46. A slipper 47 is slidably mounted within the slot 39, and has journalled therein a pin 48 carried by a crank 49. The pin 48 is eccentrically disposed in respect to the shaft 51 with which the crank 49 is rigid; and a gear 52, also rigid with the shaft 51, is adapted to effect rotation of the crank 49 because it is connected to a motor 53 through reduction gears 54 and 56. A clutch 57 is interposed between the motor 53 and the gear 56, and this clutch 57 is adapted to be thrown out or disengaged when the outer end of a lever 58 is raised, this lever being pivoted as at 59 to an extension 61 of the frame 11, and having a bifurcated portion 62 engaging one portion of the clutch in such a manner that that portion is withdrawn from the other portion of the clutch when the outer end of the lever 58 is raised. The armature 63 of a solenoid 64, is operatively connected to the lever 58, to effect raising thereof when the solenoid 64 is energized. In other words, energization of the solenoid 64 results in releasing the clutch 57 and stopping reciprocation of the beam 38.

The motor 53 is to be so arranged that when it is energized and the clutch 57 is engaged, the gear 52 will rotate in a clockwise direction when viewed as upon Fig. 3. It is obvious then, that this rotation of the gear 52, and with it the crank 49, will cause the beam 38 to rock back and forth about its pivot 66 which is journalled in the brackets 41, because of the engagement of the crank pin 48 with the slipper 47, which is thus caused to reciprocate longitudinally in respect to the beam 38. Furthermore, the movement of the beam 38 toward the rear of the machine, will be much slower than its movement toward the front, because of the greater distance from the pivot 66 to the crank pin 48 when the crank 49 is moved toward the rear of the machine, than when the crank 49 is moved toward the front of the machine. Since the pallet 33 has plastic tile-forming material imposed thereupon only during its travel toward the rear of the machine, it is obvious that this quick return mechanism makes possible more rapid operation because the pallet can be returned to receiving position thereby, at a speed greater than that at which it is practical to move the pallet when it is conveying plastic material. With the quick return mechanism 37 as described, I have found it altogether practical to operate the machine at such a speed that it completes from fifteen to eighteen cycles per minute; and it can be readily appreciated then, how such a machine will expedite the process of forming pantiles.

Means are provided for moving the track 26 and with it the carriage 31 and pallet 33, downwards when the pallet 33 is adjacent the after portion of its stroke, and moving the parts upwards again when the pallet is adjacent the forward end of its stroke. Each of the cranks 21 has a pinion 71 rigid therewith; and each pinion 71 is engaged by a rack 72, these racks being upon opposite ends of a slide bar 73 which is slidably mounted upon a lower side bar 18. A detent 74 is pivoted as at 76, to a rigid portion of the frame 11, and comprises an extended finger 77 and a pawl 78 of such configuration that it falls by gravity between two of the teeth of the after rack 72, and retains the slide bar 73 against rearward movement but permits the slide bar 73 to move forwards. A releasing bolt 81 is slidably mounted within a bracket 82 carried by the slide bar 73, and has a coil spring 83 under compression between the head 84 of the releasing bolt 81 and the bracket 82. The after end of the bolt 81 is of such configuration that when it is slid rearwards, it will engage the finger 77 of the detent 74, and lift the pawl 78 from engagement with the associated rack 72. A block 86 carried by the beam 38 is adapted to engage the head 84 of the release 81 as the beam 38 moves toward its rear extreme of movement. As rearward movement of the beam 38 continues, the spring 83 will be compressed and the release 81 will be moved toward the finger 77 of the detent 74 until the detent is moved from locking position as described, whereupon the force exerted by the spring 83 against the block 86, will move the slide bar 73 rearwards, resulting in rotating the pinions 71. The parts are so proportioned and arranged that the pinions will be thus rotated through 180°, effecting lowering of the track 26 a distance equal to twice the throw of the cranks 21. It is obvious then, that the mechanism may be so regulated that the lowering of the track will be deferred until the pallet 33 has almost reached its after extreme of movement, and then the pallet 33 will be very suddenly and rapidly dropped, with the result that its downward movement is substantially vertical. As the beam 38 approaches its forward extreme of movement, it will engage a pin 87 rigid with the slide bar 73, and return the slide bar to initial position, and consequently effect raising the track 26 to its uppermost position.

Means are provided for severing a predetermined length of the ribbon of green tile-forming material therefrom, after that length has been deposited upon the pallet 33. It is to be understood that the machine of the present invention is to be set up adjacent a pug mill, indicated at 89 upon Fig. 3, with the front side of the machine toward the mill, and with the track 26 in alignment with the outlet 90 therefrom, so that as the ribbon of plastic material issues from the pug mill, its end will be deposited upon the pallet 33.

A cutting wheel 91 composed of a rim 92 and a plurality of preferably wire spokes 93 radiating from a hub 94, is journalled in such position upon the frame 11 that as the ribbon of green tile material issues from the pug mill onto the pallet 33, it passes between two of the spokes 93 just inside the rim 92 of the wheel 91. An arm 96 is mounted for rotary movement about an axis 97 in alignment with that about which the wheel 91 is adapted to rotate. This arm 96 carries at its outer end, a portion 98 conforming to and in engagement with the rim 92, beyond which an extension 99 projects. The rim 92 is preferably formed of angle iron so as to present a flange 101 extending outwards therefrom throughout its entire circumference, and a shoe 102 carried by the portion 98 of the arm 96, engages the inside of the flange 101. A plurality of spaced ratchet teeth 103 are formed on the shoe 102, to engage within holes 104, groups of which are disposed in the flange 101 throughout the extent of the rim 92. A spring 106 is interposed between the portion 98 of the arm 96 and the flange 101 of the rim 92, urging the shoe 102 in that direction which will cause the ratchet teeth 103 to engage within the holes 104 of one of the groups. A spring 107 is under tension between the arm 96 and a portion 108 of the frame 11, urging the arm 96 into rotary movement and thus also urging the wheel 91 into rotary movement through the engagement of the arm 96 therewith by means of the ratchet teeth 103. However, the wheel 91 is normally held against movement by another series of teeth 111 carried by a locking finger 112 which also is pivoted as at 113 to a portion 114 of the frame 11. A spring 116 urges the locking finger 112 to releasing position, but a wedge 117 carried by a rod 118, normally presses the locking finger 112 into that position in which its teeth 111 will engage the holes 104 of another group. The upper end of the rod 118 is pivoted as at 119 to a lever 121 between the pins 122 and 123 respectively, which connect the lever 121 to an extension 124 of the frame 11 and to the armature 126 of a solenoid 127. The parts are so arranged that the weight of the armature 126, lever 121, and rod 118 are sufficient to overcome the force of the spring 116 and force the locking finger 112 to locking position; but when the solenoid 127 is energized, the wedge 117 will be withdrawn, permitting the spring 116 to move the locking finger 112 to releasing position, whereupon the spring 107 will rapidly pull the arm 96 downwards, rotating the wheel 91 a distance sufficient to pass one of the spokes 93 through the ribbon of plastic material which extends through the wheel 91 onto the pallet 33.

It is desirable furthermore, to provide means for stopping the wheel 91 against further rotation after it has moved through an arc equal to the distance between two of the spokes 93. Consequently, a switch 131 composed of contacts 132 and 133, is mounted in such position that the contact 132 is adapted to be engaged by a finger 134 carried by the arm 96, and pressed to switch-closing position when the arm 96 is in fully withdrawn or raised position, as indicated upon Fig. 5. Any suitable means may be employed for normally retaining the switch contacts 132 and 133 separated—for example, the contacts themselves, may be composed of resilient material such as spring brass, and so arranged that the contacts are separated except when engaged by the finger 134.

Reference to Fig. 11 will disclose that the switch 131 is connected in series with the solenoid 127, by a conductor 136, which will explain that instantly the arm 96 has started its downward movement, the solenoid 127 will be de-energized because the finger 134 is moved away from the switch 131, permitting it to open, thus breaking the solenoid circuit. It is obvious then, that the weight of the parts associated with the wedge 117, will immediately again urge the locking finger 112 outwards so that when the next group of holes 104 comes into register with the teeth 111, they will drop therein and accurately position the wheel 91 for subsequent passage of another length of green tile material onto the pallet 33. The rim 92 of the cutting wheel 91, is guided by a plurality of rollers 137, each of which is journalled upon a bracket 138 carried by an extension 139 of the frame 11. One or more of the brackets 138, is pivotally mounted upon the extension 139 of the frame, so that its roller 137 may be resiliently pressed as by a spring 140, into rim engaging position, the purpose being to compensate for any deviations from true, circular configuration which may be present in the rim 92.

A bell crank 141 is mounted for rotary movement about an axis 142 within a bracket 143 rigid with one of the posts 12 of the frame 11. One end of the bell crank 141 is connected by a link 144 to the beam 38, and the other end of the bell crank 141 is connected by links 146 to a slipper 147, which is slidably mounted upon a vertically disposed guide rod 148 rigid with the frame 11 and disposed adjacent the extension 99 of the arm 96. The bell crank 141 and its associated links are so arranged that they will effect vertical reciprocation of the slipper 147 and upper end of the link 146 as the beam 38 reciprocates about its pivot 66. Consequently, each time the beam 38 moves toward the rear of the machine, the upper end of the link 146 will move upwards so that a roller 149 journalled thereupon, will engage the under side of the extension 99 and push the arm 96 upwards to retracted position against the action of the spring 107. It is to be understood that the ratchet teeth 103 on the shoe 102, are so shaped that they will be released from their engagement in the holes 104 in the flange 101 of the wheel 91, when the arm 96 starts its reverse movement in respect to the wheel 91, but will engage in the next group of holes 104 when moving forwards in respect to the wheel 91.

When the track 26 and with it the pallet 33, are dropped as hereinabove described, they are adapted to pass through a tray 156 shaped to permit the pallet 33 to pass downwards therethrough but to engage the edges of the green tile and retain the tile as the pallet passes out from under it. Each tray comprises side bars 157 diverging slightly from an end bar 158, the other end being left open to permit the track 26 to move freely in respect to the tray 156 after it has been properly positioned to receive the tile. The open end of each of the trays 156, is braced by an inverted U-shaped bar 159, rigid with both of the side bars 157 adjacent the open end of the tray 156. A plurality of trays 156, is receivable within a guideway composed of rails 161 spaced a distance to receive the trays endwise therebetween, these rails composing the bed 16. Reciprocably mounted upon the frame 11 at a slightly lower elevation than the bed 16, is a framework 162 provided with a plurality of dogs 163 spaced a distance equal to the overall width of one of the trays 156. The parts are so proportioned and arranged that the framework 162 is adapted to move all the trays 156 supported upon the bed 16, toward the left as viewed upon Fig. 1, but to release the trays as the framework 162 moves backward. Furthermore, each of the horizontal bars 159 is provided with a notch 166 within which a dog 167 is adapted to seat when the associated tray 156 has been moved to receiving position. The dog 167 is pivoted upon an extension 168 of the frame 11, and is pressed by a spring 169 to tray engaging position to resiliently retain the tray in proper alignment with the pallet 33. A lever 171 rigid with the beam 38, has pivoted to its outer end a link 172, which, in turn, is adjustably pivoted to a bell crank 173. The bell crank 173 is journalled for rotary movement about an axis 174 within brackets 176, and is operatively connected by a link 177 to the framework 162. It is obvious therefore, that as the beam 38 reciprocates about its pivot 66, the framework 162 will be synchronously reciprocated in sliding movement, and that each time the framework 162 moves toward the left end of the machine, it will carry the trays 156 toward receiving position, and that each time the framework 162 moves backwards, the trays 156 will be released by the dogs 163 so that they are not also slid backwards.

A slot 178 is provided in the bell crank 173, and the link 172 is connected to the bell crank 173 by means of a pin 179 adapted to be connected thereto at any point intermediate the ends of the slot 178, with the result that the stroke of the framework 172 may be varied by properly positioning the pin 179 within the slot 178, and then locking the parts as arranged. This feature is to make possible the accommodation of trays 156 of different dimensions when the pallet 33 is changed for another one of a different size, so that the trays will be properly fed to receiving position.

The carriage 31 is provided with an arm 181 extending laterally therefrom and carrying at its outer end a pusher plate 182. The arm 181 extends through a slot 183 in a plate 184 disposed just beyond the track 26 so that after a tray has had a tile imposed thereupon, the next advancing stroke of the framework 162 will push the filled tray from receiving position, onto the plate 184. The subsequent stroke of the pallet to deposit the next tile upon a tray 156, will cause the pusher plate 182 to engage the filled tray and push it from the plate 184 onto any suitable conveyor adapted to transport the filled tray to the drying racks.

A suitable switch-box 186 controlled by an operating handle 187, may be positioned at any suitable location upon the machine to control the supply of current to the motor 53 and the other electrical devices forming constituent parts of the machine, so that the machine may be started and stopped at the will of the operator, simply by throwing the handle 187 to the desired position, it being understood that a main switch 188 is contained within the switch-box 186.

An arm 191 rigid with the frame 11, extends in such position that it is disposed over the after end of the pallet 33 when the pallet is in receiving position. A pivotal mounting 192 is carried at the forward end of the arm 191, to retain a double switch 193. This switch 193 consists of a base 194 carrying a contact 196 and also a resilient switch arm 197 and a rigid switch arm 198 respectively, suitably insulated from each other. The natural resilience of the material of which the switch arm 197 is composed, normally keeps a contact 199 carried by the switch arm 197, separated from the contact 196. However, the contact 199 extends through the switch arm 197 so that it is normally in engagement with the contact 201 carried by the switch arm 198. The switch 193 also carries a pusher arm 202 pivotally mounted as at 203 to the base 194. This pusher arm 202 carries a pin 204 extending through the switch arm 198 so that its head 206 will engage the switch arm 197 when the pusher arm 202 is pressed upwards to break electrical connection between the contacts 199 and 201 and establish electrical connection between the contacts 199 and 196.

Another switch 211 is connected in series with the contact 201. This switch 211 comprises contacts 212 and 213 carried by switch arms 214 and 216 respectively, which are normally held separated but which are adapted to be brought together when a preferably fibre block 217 which is rigid with the gear 52 and so disposed thereon that it is adapted to engage the switch arm 216 and bring the contacts 213 and 212 into electrical engagement when the quick return mechanism 37 has returned the pallet 33 to receiving position.

The electrical connections of the mechanism are as follows:

The main switch 188 is interposed in preferably both leads 221 and 222 of any suitable source of electrical energy. Conductors 223 and 224 lead from the switch 188 to the motor 53, so that the motor is constantly energized as long as the main switch 188 is closed. From the conductor 224, a conductor 226 leads to the switch contact 199 so that this contact also is constantly energized as long as the main switch 188 is closed. The switch contact 196 is connected by a conductor 227 to the switch arm 133, and the switch arm 132 is connected by the conductor 136 to the solenoid 127 as previously described; and from the solenoid 127, a conductor 228 leads back to the other main conductor 223, completing the circuit of the solenoid 127. The switch contact 201 is connected by a conductor 231 to the contact 212, and the contact 213 is connected by a conductor 232 to the solenoid 64, which, in turn is connected by a conductor 233 back to the main conductor 223, completing the circuit of the solenoid 64.

Means for trimming the lateral edges of the green tile, are provided, and are most clearly shown upon Figs. 7, 8, and 9. It is to be understood that the ribbon of green tile-forming material is of constant width. Consequently, when it is superimposed upon the pallet 33 which, as previously described, is smaller at one end than at the other, the edges of the green tile will depend further below the edges of the pallet at the smaller end of the pallet than at the larger end. Consequently, I have provided a pair of trimming wires 241 in such position that each is adapted to trim one of the lateral edges of the ribbon carried by the pallet 33 as the pallet moves from initial position toward the tray 156. Each of these wires 241 is carried by a suitable bracket 242 rigid with the frame 11, and is so disposed that as the pallet 33 moves rearwards on the track 26, the lateral edges of the pallet 33 will either actually scrape against the wires 241 or pass very close thereto, so that any plastic material depending beyond the edges of the pallet 33, will be trimmed therefrom. Any suitable receptacle may be provided to receive the trimmings and convey them from the device.

Means are further provided for preventing longitudinal displacement of the ribbon of material from the pallet 33 as this trimming action proceeds. The carriage 31 is provided with a bolt 246 extending rigidly upwards therefrom adjacent the forward end thereof. A plate 247 having an elongated slot 248 through which the bolt 246 loosely extends, is slidably mounted upon the top of the carriage 31. The head 249 of the bolt 246, is spaced above the top of the plate 247 when the plate is lying flat upon the carriage, so that the plate 247 is permitted a certain degree of pivotal movement about its forward edge 251, as well as sliding movement. A leaf spring 252 secured to the carriage 31 as by rivets 253, presses downward against the after portion of the plate 247 to normally retain the plate 247 flat upon the carriage 31; and a coil spring 254 under tension between the forward edge 251 of the plate 247 and a pin 256 carried by the carriage 31, urges the plate 247 forwards in sliding movement, being limited of course, by the length of the slot 248. The plate is provided adjacent its forward end 251, with preferably a pair of laterally extending arms 258, each of which curves downwards at its outer end 259, and has extending forward from its lower and outer end, a forwardly extending arm 261. These forwardly extending arms 261 are of such length that their forward ends support a transverse bar 262 extending across the forward end of the carriage 31 as clearly shown upon Fig. 8. A pusher plate 263 is supported by brackets 264 rigid with the transverse bar 262, the parts being so proportioned and arranged that when the plate 247 is in normal position, the pusher plate 263 extends above and closely adjacent the forward end of the pallet 33, the purpose being for it to engage the forward end of the green tile after it has been severed from the ribbon of tile-forming material. However, a pair of pins 266 are provided, each being rigidly supported by a bracket 267 rigid with the track 26. The transverse bar 262 carries a pair of fingers 268 engageable with the pins 266 as the carriage 31 approaches its forward extreme of movement. Each of the fingers 268 includes a sloping portion 269 and a vertical portion 271, and are so proportioned that the sloping portion 269 will engage its associated pin 266 just before completion of forward movement of the carriage 31, so that as the carriage completes this forward movement, the pusher plate 263 will be pulled downwards far enough for its upper end to clear the under side of the pallet 33, whereupon the vertical portion 271 of each of the fingers 268 will engage its associated pin 266, whereupon continued forward movement of the carriage 31 will result in sliding the plate 247 upon the surface of the carriage carrying the pusher plate completely over the pallet 33. The purpose of this arrangement is to permit the cutting wires or spokes of the cutting wheel 91, to pass very close to the end of the pallet 33 in performing their cutting operation, so that the material may be cut without deforming the end of the tile.

The method of operation of tile-forming machine of the present invention is substantially as follows:

The motor 53 is first started by closing the main switch 188. Consider the mechanism as being in initial position, i. e., with the pallet 33 in its extreme forward and upward position, at which time the fibre block 217 carried by the gear 52, will be holding the switch 211 closed. This will result in the energization of the solenoid 64, because the contacts 199 and 201 are also in engagement through the natural resiliency of the switch arm 197. As previously explained, energization of the solenoid 64 will result in disconnecting the clutch 57, so that the pallet 33 is held motionless until the desired length of tile-forming material has been deposited from the pug mill upon the pallet 33. When the end of the ribbon of tile material engages and raises the plate 202, the head 206 of the pin 204, will lift the switch contact 197, breaking electrical connection between the contacts 199 and 201, and establishing electrical connection between the contacts 196 and 199. The completion of the circuit through the contact 196 and 199, will result in the energization of the solenoid 127, since the switch 131 is being held closed by the finger 134 of the arm 96. As previously explained, this energization of the solenoid 127 will permit the spring 116 to remove the locking finger 112 to releasing position, whereupon the spring 107 will pull the arm 96 downward with a considerable degree of velocity, turning the cutting wheel 91 with it so that one of the spokes 93 severs the tile material which has been deposited upon the pallet 33, from the remainder of the ribbon issuing from the pug mill. As the arm 96 leaves its uppermost position, the finger 134 is removed from the switch 131, so that it is permitted to open, de-energizing the solenoid 127 almost immediately after it has been energized. As a result, the wedge 117 will drop, urging the locking finger 112 to locking position so that its teeth 111 will drop into the next group of holes 104 when the cutting operation has been completed, and hold the wheel 91 accurately for the subsequent passage of more of the ribbon between another two of its spokes.

The separation of the contacts 199 and 201 will result in the de-energization of the solenoid 64, permitting its armature 63 to drop so that the clutch 57 is engaged, whereupon the motor 53 will effect rotation of the gears 56, 54, and 52, starting the quick return mechanism 37 into operation. This will result in moving the carriage 31 and pallet 33 toward the rear of the machine, i. e., toward one of the trays 156 which has been properly positioned in alignment therewith. Before the large end of the pallet 33 clears the switch 193, the block 217 carried by the gear 52, will have passed out of engagement with the switch contact 216, so that the switch 211 will be thrown open before the contact 199 is permitted to again engage the contact 201, the purpose being to prevent energization of the solenoid 64 until the machine has completed a cycle.

As previously described, the block 86 carried by the beam 38, will engage the head 84 of the release 81 as the beam 38 moves toward the rear of the machine, tensioning the spring 83 until the pallet 33 has nearly reached its rearward extreme of movement. At this time, the pallet will have moved through the open end of the aligned tray 156 to position the green tile supported thereby, directly over the tray. Then, the release 81 will effect withdrawal of the pawl 78 from the rack 72 with which it is in engagement, whereupon the spring 83 will rapidly force the slide bar 73 toward the rear of the machine, causing both cranks 21 to execute onehalf of a convolution, pulling the track 26 vertically downwards. This causes the pallet 33 to pass downwards through the tray 156, leaving the green tile upon the tray because of the engagement of the edges of the tile with the side bars 157 of the tray. The beam 38 now commences its reverse movement toward the front of the machine; and as this continues, it will engage the pin 87, causing the slide bar 73 to move toward the front of the machine, turning the cranks 21 to initial position, and thus again elevating the track 26 and with it the carriage 31 and pallet 33.

It is to be understood that as the pallet 33 moves from receiving position, the pusher plate is permitted to move up into operative position behind the severed end of the green tile carried by the pallet 33, because of the finger 268 moving away from their respective pins 266, permitting the spring 254 to move the pusher plate 263 out from under the pallet 33, and the spring 252 to elevate the pusher plate 263 so that it will engage the end of the plastic tile and prevent the tile's being pushed off the pallet as the lower edges of the tile are trimmed by the wires 241.

As the beam 38 moves toward the rear of the machine, the bell crank 141 will be pivoted within its brackets 143 by the link 144 raising the link 146. As the guide 147 carried by the link 146, moves upwards on its guide rod 148, the roller 149 will engage the under side of the extension 99 of the arm 96, whereupon the teeth 103 will be removed from the holes 104 in the flange 101 in which they are engaged, because the locking wheel 91 is held stationary by engagement of the teeth 111 of the locking finger 112 in another group of holes 104. Thus the arm 96 is reset again, tensioning the spring 107 and permitting the teeth 103 to enter the next group of holes 104. Furthermore, the finger 134 of the arm 96, will again close the switch 131, putting the circuit of the solenoid 127 in condition to be again completed when another length of tile material has been deposited upon the pallet 33.

As the cycle of the machine nears completion, the fibre block 217 carried by the gear 52, will again engage the contact 216 to complete the circuit of the solenoid 64, it being understood of course, that the contacts 199 and 201 have previously come together when the end of the tile carried by the pallet 33, cleared the switch 193. Consequently, the pallet 33 will be held stationary until the necessary length of ribbon is again deposited upon the pallet 33, causing the switch contacts 199 and 201 to again separate, and the switch contacts 196 and 199 to engage, whereupon another cycle will be started.

After the tile has been deposited upon the aligned tray 156 by the pallet 33, the framework 162 will be pulled toward the left, as viewed upon Fig. 2, by the bell crank 173 sliding all the trays 156 to push the loaded tray from alignment with the pallet 33, onto the plate 184. Then, upon a subsequent stroke of the carriage 31 toward the rear of the machine, the pusher plate 182 will eject the loaded tray from the machine onto any suitable conveyor. It is to be understood that a bar 276 supported rigidly by the frame 11, engages within notches in the bar 159 of a tray 156 as it is moved into alignment, so that the otherwise unsupported forward end of the tray will be properly disposed to permit the pallet 33 and the green tile carried thereby, to pass into the open end of the tray.

It is to be understood that the details of the invention as herein disclosed, are subject to alteration within the spirit or scope of the appended claims.

I claim:

1. A tile machine comprising a pallet adapted to receive an end of a ribbon of plastic tile forming material, means for severing a predetermined length of said material on said pallet from the ribbon, a tray, means for moving said pallet to deposit said severed length of material thereon, and means for returning said pallet to receiving position.

2. A tile machine comprising a pallet adapted to receive an end of a ribbon of plastic tile forming material, means for severing a predetermined length of said material on said pallet from the ribbon, a plurality of trays, means for moving said pallet to deposit said severed length of material thereon, means for returning said pallet to receiving position, and means for advancing said trays to place an empty tray in receiving position.

3. A tile machine comprising a pallet adapted to receive an end of a ribbon of plastic tile forming material, means for severing a predetermined length of said material on said pallet from the ribbon, a plurality of trays, means for moving said pallet to deposit said severed length of material thereon, means for returning said pallet to receiving position, means for advancing said trays to place an empty tray in receiving position, and means for successively ejecting said trays after each has received a severed length of said material from said pallet.

4. A tile forming machine comprising a pallet adapted to receive an end of a continuous ribbon of plastic tile forming material and form said material to a tile of predetermined shape, means for severing from said ribbon a length thereof required for a single tile, a plurality of trays, each being open at one end, means for intermittently advancing said trays to bring them successively into alignment with said pallet, means for moving said pallet horizontally over the tray in alignment therewith, and means for moving said pallet downwards through said aligned trays to deposit said formed tile thereon, said form moving means being adapted to then return the form to receiving position.

5. A tile forming machine comprising a pallet adapted to receive an end of a continuous ribbon of plastic tile forming material and form said material to a tile of predetermined shape, means for severing from said ribbon a length thereof required for a single tile, a plurality of trays, each being open at one end, means for intermittently advancing said trays to bring them successively into alignment with said pallet, means for moving said pallet horizontally over the tray in alignment therewith, means for moving said pallet downwards through said aligned trays to deposit said formed tile thereon, said form moving means being adapted to then return the form to receiving position, said tray advancing means being synchronized with said pallet moving means.

6. A tile forming machine comprising a pallet adapted to receive an end of a continuous ribbon of plastic tile forming material and form said material to a tile of predetermined shape, means for severing from said ribbon a length thereof required for a single tile, a plurality of trays, each being open at one end, means for intermittently advancing said trays to bring them successively into alignment with said pallet, means for moving said pallet horizontally over the tray in alignment therewith, means for moving said pallet downwards through said aligned trays to deposit said formed tile thereon, said form moving means being adapted to then return the form to receiving position, said tray advancing means being synchronized with said pallet moving means, and means for successively ejecting each of said trays after receiving a tile.

7. A tile forming machine comprising a pallet adapted to receive an end of a continuous ribbon of plastic tile forming material and form said material to a tile of predetermined shape, means for severing from said ribbon a length thereof required for a single tile, a plurality of trays, each being open at one end, means for intermittently advancing said trays to bring them successively into alignment with said pallet, means for moving said pallet horizontally over the tray in alignment therewith, means for moving said pallet downwards through said aligned trays to deposit said formed tile thereon, said form moving means being adapted to then return the form to receiving position, said tray advancing means being synchronized with said pallet moving means, and means for varying the stroke of said tray advancing means.

8. In a tile forming machine a frame, a track mounted thereon for vertical movement, a tile forming pallet slidably mounted on said track, means for reciprocating said pallet on said track, and means for moving said track downwards when the pallet is adjacent one end of its stroke and upwards when the pallet is adjacent the other end of its stroke.

9. In a tile forming machine a frame, a track mounted thereon for vertical movement, a tile forming pallet slidably mounted on said track, means for reciprocating said pallet on said track, and means for moving said track rapidly downwards when the pallet is adjacent one end of its stroke and upwards when the pallet is adjacent the other end of its stroke.

10. In a tile forming machine a frame, a horizontal track mounted thereon for vertical movement, cranks journalled on said frame in alignment with said track, a connecting rod pivoted to each of said cranks and to said track to support the latter, a pallet slidably mounted on said track, means for reciprocating said pallet upon the track, means for rotating said cranks to lower the track when the pallet is adjacent one end of its stroke, and means for rotating said cranks to raise the track when the pallet is adjacent the other end of its stroke.

11. In a tile forming machine a frame, a horizontal track mounted thereon for vertical movement, cranks journalled on said frame in alignment with said track, a connecting rod pivoted to each of said cranks and to said track to support the latter, a gear affixed to each of said cranks, a rack slidably mounted on said frame and enmeshed with both of said gears, a pallet slidably mounted on said track, means for reciprocating said pallet, and means operable by said reciprocating means for moving the rack in one direction when the pallet is adjacent one end of its stroke and for moving the rack in the other direction when the pallet is adjacent the other end of its stroke.

12. In a tile forming machine a frame, a horizontal track mounted thereon for vertical movement, cranks journalled on said frame in alignment with said track, a connecting rod pivoted to each of said cranks and to said track to support the latter, a gear affixed to each of said cranks, a rack slidably mounted on said frame and enmeshed with both of said gears, a detent normally holding said rack against movement, a detent release carried by said rack, a spring interposed between said rack and said release normally holding said release spaced from said detent, a pallet slidably mounted on said track, means for reciprocating said pallet, means carried by said reciprocating means engageable with said release as the pallet approaches one end of its stroke to tension said spring and move the release toward the detent, said release being adapted to move the detent from rack holding position when a predetermined amount of tension has been imposed on said spring, and said spring being adapted to slide the rack and effect lowering of said track, and means interposed between said rack and said reciprocating means for raising said track as the pallet approaches the other end of its stroke.

13. In a tile forming machine, a pallet adapted to receive an end of a ribbon of plastic tile forming material, means for severing a predetermined length of said material on said pallet from the ribbon, means for moving said pallet to convey said severed length from severing position, and means for holding said pallet stationary while material is being deposited thereon.

14. In a tile forming machine, a pallet adapted to receive an end of a ribbon of plastic tile forming material, and means for severing a predetermined length of said material on said pallet from the ribbon, said severing means comprising a wheel having a plurality of spokes and journalled for rotation in a plane extending transversely of said pallet adjacent the forward end thereof, said ribbon of material being adapted to pass onto said pallet between adjacent spokes of said wheel, and means for rapidly rotating said wheel after a predetermined length of ribbon has been deposited on said pallet.

15. In a tile forming machine, a pallet adapted to receive an end of a ribbon of plastic tile forming material, and means for severing a predetermined length of said material on said pallet from the ribbon, said severing means comprising a wheel having a plurality of spokes and journalled for rotation in a plane extending transversely of said pallet adjacent the forward end thereof, said ribbon of material being adapted to pass onto said pallet between adjacent spokes of said wheel, an arm pivoted for rotary movement about an axis in alignment with the axis of said wheel, a spring interposed between said arm and a stationary portion of said machine urging said arm into rotary movement, means for connecting said wheel to said arm for rotary movement therewith in one direction, and means for resetting said arm against the action of said spring, said connecting means being automatically disengageable as the arm moves backward and automatically engageable when the arm has completed its return movement.

16. In a tile forming machine, means adapted to receive an end of a ribbon of plastic tile forming material, and means for severing an end of said ribbon from the remainder thereof, said severing means comprising a wheel having spokes and rotatably mounted in position for the end of said ribbon to pass therethrough between spokes thereof, an arm mounted for rotary movement adjacent said wheel, spring means urging said arm to rotary movement, and a finger carried by said arm and engageable with said wheel to turn the wheel with the arm when the arm is moved by its spring, means for resetting said arm, said finger being automatically disengageable as the arm reverses its direction of movement, and automatically re-engageable upon completion of the arm's return movement.

17. In a tile forming machine, a pallet adapted to receive an end of a ribbon of plastice tile forming material, a switch positioned thereadjacent to be closed when a predetermined length of said ribbon has been received upon said pallet, and means for severing said length of ribbon from the remainder thereof, said severing means comprising a wheel having spokes and rotatably mounted in position for the end of said ribbon to pass therethrough between spokes thereof, an arm mounted for rotary movement adjacent said wheel, spring means urging said arm to rotary movement, a finger carried by said arm and engageable with said wheel to turn the wheel with the arm when the arm is moved by its spring, means for resetting said arm, said finger being automatically disengageable as the arm reverses its direction of movement, and automatically re-engageable upon completion of the arm's return movement, a locking finger normally holding said wheel against rotary movement, and a solenoid operatively connected to said locking finger to effect withdrawal thereof when energized, said switch being electrically connected to said solenoid to energize the solenoid when the switch is closed.

18. In a tile forming machine, a pallet adapted to receive an end of a ribbon of plastic tile forming material, a switch positioned thereadjacent to be closed when a predetermined length of said ribbon has been received upon said pallet, and means for severing said length of ribbon from the remainder thereof, said severing means comprising a wheel having spokes and rotatably mounted in position for the end of said ribbon to pass therethrough between spokes thereof, an arm mounted for rotary movement adjacent said wheel, spring means urging said arm to rotary movement, a finger carried by said arm and engageable with said wheel to turn the wheel with the arm when the arm is moved by its spring, means for resetting said arm, said finger being automatically disengageable as the arm reverses its direction of movement, and automatically re-engageable upon completion of the arm's return movement, a locking finger normally holding said wheel against rotary movement, a solenoid operatively connected to said locking finger to effect withdrawal thereof when energized, said switch being electrically connected to said solenoid to energize the solenoid when the switch is closed, and a second switch interposed in the solenoid circuit resiliently urged to circuit opening position, said second switch being closed by said arm when the arm is in fully retracted position.

19. In a tile forming machine, a frame, a carriage movably mounted thereon, and an interchangeable pallet removably securable to said carriage in position to receive an end of a ribbon of plastic tile forming material.

20. In a tile forming machine, a frame, a carriage movably mounted thereon, a pallet removably securable to said carriage in position to receive an end of a ribbon of plastic tile forming material, means for severing a length of said ribbon on said pallet from the remainder thereof, means for trimming the edges of said severed portion, a pusher plate carried by said carriage, means for positioning said plate behind the severed portion during the operation of said trimming means, and means for withdrawing said plate while material is being deposited on the pallet.

In testimony whereof I have signed my name to this specification.

BURT R. SIMMONS.